United States Patent
Peterson et al.

(10) Patent No.: US 6,373,204 B1
(45) Date of Patent: Apr. 16, 2002

(54) APPARATUS AND METHOD FOR DRIVING A PLURALITY OF INDUCTION MOTORS

(75) Inventors: William Anders Peterson, Vestal; Arthur Paull Lyons, Maine, both of NY (US)

(73) Assignee: BAE Systems Controls, Inc., Johnson City, NY (US)

( * ) Notice: Subject to any disclaimer, the term of this patent is extended or adjusted under 35 U.S.C. 154(b) by 0 days.

(21) Appl. No.: 09/590,116

(22) Filed: Jun. 8, 2000

(51) Int. Cl.[7] .................................................. H02P 5/46
(52) U.S. Cl. ......................... 318/41; 318/112; 318/727
(58) Field of Search ............................ 318/727, 34, 41, 318/42, 44, 112, 254, 87, 52, 71, 802

(56) References Cited

U.S. PATENT DOCUMENTS 3,911,340 A * 10/1975 Plunkett ..................... 318/802
4,061,948 A * 12/1977 Lamparter ................... 318/254
4,327,313 A *  4/1982 Tsuboi et al. .................. 318/52
4,335,337 A *  6/1982 Okamatsu et al. ............. 318/52
4,689,543 A    8/1987 Hucker

OTHER PUBLICATIONS

Mohan, Undeland and Robbins, "Power Electronics Coverters, Applications, and Design," pp. 412–415, Second Ed. (1995).

* cited by examiner

Primary Examiner—Khanh Dang
(74) Attorney, Agent, or Firm—Geoffrey H. Krauss, Esq.

(57) ABSTRACT

A motor controller includes: a driver stage operable to provide voltage and current to a plurality of induction motors over a single power bus; and a control unit operable to monitor the current drawn from the driver stage and cause one or more of the induction motors to operate in a regenerative mode to supply current to at least one other of the induction motors when the current drawn from the driver stage exceeds a threshold.

24 Claims, 4 Drawing Sheets

APPARATUS AND METHOD FOR DRIVING A PLURALITY OF INDUCTION MOTORS

BACKGROUND OF THE INVENTION

1. Field of the Invention

The present invention relates to an apparatus and/or method for providing voltage and current to a plurality of induction motors and, more particularly, operating one or more of the induction motors in a regenerative mode to supply current to at least one other of the induction motors under certain circumstances.

2. Related Art

A motor controller is utilized to provide voltage and current to an induction motor. In a normal mode of operation, the voltage and current sourced to the induction motor oscillate at a frequency which (together with a magnitude of the voltage) dictate a speed at which the motor rotates.

FIG. 1 illustrates a conventional configuration for providing voltage and current to an induction motor. The conventional configuration includes a conventional control unit 10, which provides command signals to a motor driver 12. The motor driver 12 often receives power from a DC source 14 and converts the DC power to the voltage and current for the induction motor 16. As the induction motor 16 requires AC voltage and current, and in this example the motor driver 12 receives DC power from source 14, the motor driver 12 shown in FIG. 1 is an inverter. In some cases, the motor driver 12 provides three-phase AC voltage and current to the induction motor 16 if required.

As induction motors produce very large in-rush currents (and low torque) at start up, the conventional control unit 10 often includes a current detection circuit which senses the current drawn by the induction motor 16 from the motor driver 12. The sensed current is utilized by the conventional control unit 10 to adjust the voltage and frequency provided by the motor driver 12 to the induction motor 16 such that excessive currents are not drawn by the induction motor 16.

U.S. Pat. No. 4,689,543 to David J. Hucker discloses a conventional control protocol for adjusting the voltage and frequency delivered from the motor driver 12 to the induction motor 16. The entire disclosure of U.S. Pat. No. 4,689,543 is incorporated herein by reference. At start up, the voltage and frequency commanded by the conventional command unit 10 are at a maximum and, as the current drawn by the induction motor 16 exceeds a permitted level, the voltage and frequency are reduced until a stable operating point is reached. Until the induction motor 16 accelerates, the current drawn decreases and the conventional control unit 10 increases the voltage and frequency until a desired operating point is obtained. The Hucker patent makes clear that the voltage and frequency are reduced in a way which prevents the induction motor 16 from entering a regenerative mode inasmuch as both the frequency and voltage are reduced linearly but not equally as a function of current (See FIGS. 3 and 4 of the Hucker patent).

Unfortunately, the conventional configuration for providing drive power shown in FIG. 1 is unsuitable for providing voltage and current to a plurality of induction motors over a single bus, particularly when some of the induction motors are rotating and others of the induction motors require high start-up currents. Indeed, if the control protocol utilized by the conventional control unit 10 and motor driver 12 of FIG. 1 were used to drive a plurality of induction motors over a single bus, all of the induction motors would have to be started at one time. If some of the induction motors were already rotating and others were not rotating, the rotating motors would have to be stopped and all motors started together. Furthermore, even if stopping all the induction motors were acceptable (which is often not the case) a current overload during start-up could cause a positive feedback condition resulting in severe overload of the motor driver 12. In particular, the conventional control unit 10 may attempt to reduce the voltage provided by the motor driver 12 to the induction motors in an attempt to reduce current draw during an overload. When the voltage is reduced in the rotating induction motors, their magnetization flux will likewise reduce, thereby increasing the slip in the induction motors. This has the unfortunate effect of increasing (not decreasing) the current drawn by the induction motors. The conventional control unit 10 might then attempt to further reduce the voltage in the induction motors, thereby creating a positive feedback condition and eventually critically overloading the motor driver 12.

One way of avoiding the positive feedback condition is to design the motor driver 12 such that an over-current condition will not be reached while the induction motors are starting up. Unfortunately, this would require sizing electronic components within the motor driver 12 to handle currents which are orders of magnitude greater than might otherwise be required during normal operation.

Accordingly, there is a need in the art for a new apparatus and method for providing voltage and current to a plurality of induction motors over a single bus which (i) does not require that a motor driver provide excessive amounts of start-up current to the induction motors; (ii) permits some induction motors to start while other induction motors are already rotating; and (iii) permits relatively smaller electronic components to be utilized in the motor driver for providing the voltage and current to the induction motors.

SUMMARY OF THE INVENTION

In order to overcome the disadvantages of the prior art, a motor controller in accordance with one aspect of the present invention includes: a driver stage operable to provide voltage and current to a plurality of induction motors over a single power bus; and a control unit operable to monitor the current drawn from the driver stage and cause one or more of the induction motors to operate in a regenerative mode to supply current to at least one other of the induction motors when the current drawn from the driver stage exceeds a threshold.

Preferably, the control unit is operable to monitor a frequency of the voltage from the driver stage and determine a ratio of the voltage to the frequency. The regenerative mode is preferably entered by commanding the driver stage to reduce the voltage and frequency to the one or more induction motors while substantially maintaining the ratio of the voltage to the frequency. Respective magnitudes by which the voltage and frequency to the one or more induction motors are reduced are preferably functions of the current drawn from the driver stage such that a desirable amount of regenerative current is produced. Regenerative current produced by the one or more induction motors operating in the regenerative mode may advantageously be utilized to source at least one induction motor requiring, for example, start-up current.

As the at least one induction motor requiring startup current reaches sufficient rotational speeds, an amount of current required by that induction motor will correspondingly reduce and eventually the regenerative mode will be terminated. This is accomplished by preferably increasing at least one of the voltage and frequency delivered to the induction motors such that the regenerative mode is terminated and the induction motors are accelerated.

According to another aspect of the present invention, a method of providing voltage and current to a plurality of induction motors over a single bus includes: sourcing voltage and current to the plurality of induction motors; determining whether the current drawn exceeds a threshold; and causing one or more of the induction motors to operate in a regenerative mode when the threshold is reached or exceeded such that regenerative current is supplied to at least one induction motor.

Other objects, features and advantages of the present invention will become apparent from the following description of the invention, which refers to the accompanying drawings.

BRIEF DESCRIPTION OF THE DRAWINGS

For the purposes of illustrating the invention, there are shown in the drawings forms which are presently preferred, it being understood, however, that the present invention is not limited to the precise arrangements and instrumentalities shown.

DETAILED DESCRIPTION OF THE PRESENT INVENTION

Figure 1:
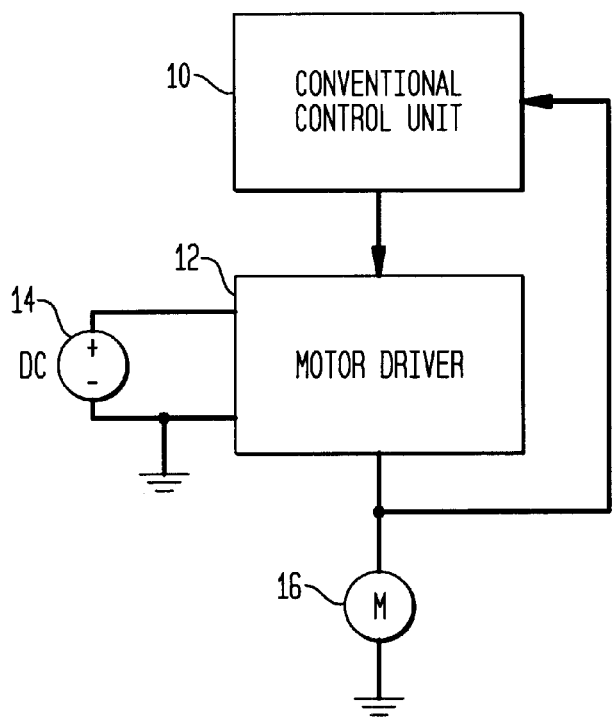
FIG. 1 is a block diagram of a conventional system for providing operating power to an induction motor.
Figure 2:
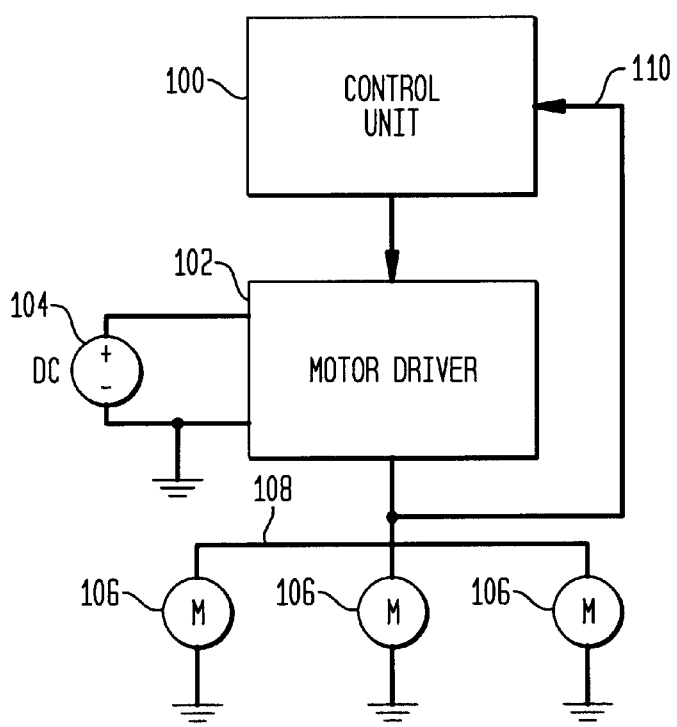
FIG. 2 is a block diagram illustrating a configuration of delivering operating power to a plurality of induction motors over a single bus in accordance with one aspect of the invention.

Referring now to the drawings, wherein like numerals indicate like elements, there is shown in FIG. 2, an apparatus for providing voltage and current to a plurality of induction motors 106 in accordance with one aspect of the present invention. The apparatus includes a control unit 100, a motor driver 102 (which receives voltage from a source 104), and the plurality of induction motors 106 which receive voltage and current from the motor driver 102 over a common bus 108. In accordance with one aspect of the present invention, the control unit 100 is operable to monitor the current drawn from the driver stage 102 by way of current sense path 110.

The apparatus is preferably capable of providing start-up current to at least one of the induction motors 106 while one or more others of the induction motors 106 are already rotating. To this end, the control unit 100 is preferably operable to monitor the current drawn from the driver stage 102 and cause one or more of the induction motors 106 to operate in a regenerative mode to supply current (e.g., start-up current) to at least one other of the induction motors 106. It is most preferred that the control unit 100 command that one or more of the induction motors 106 enter the regenerative mode when the current drawn from the driver stage 102 exceeds a predetermined threshold (or set point).

Figure 3A:
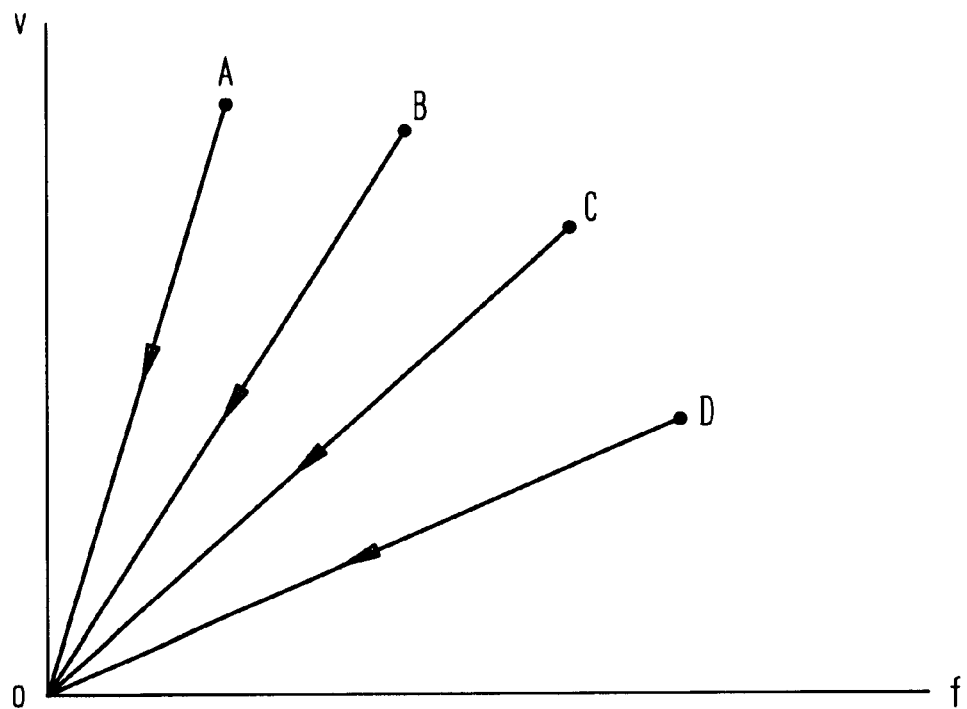
FIGS. 3a and 3b are graphs illustrating relationships between voltage, current, and frequency delivered to the plurality of induction motors by the configuration of FIG. 2.
Figure 3B:
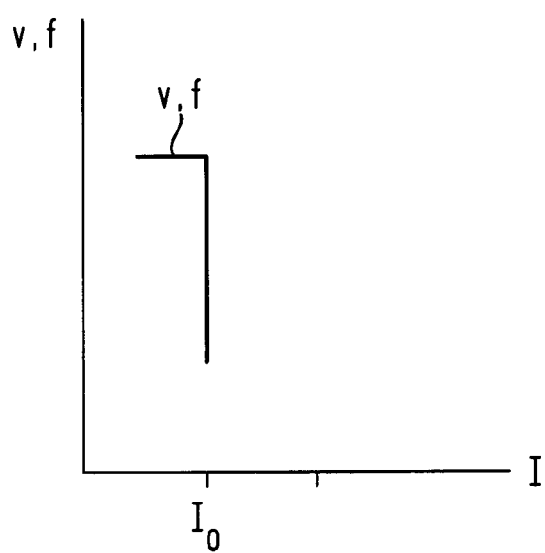

With reference to FIGS. 3a and 3b, the control unit 100 is preferably operable to monitor a frequency of the voltage delivered to the induction motors 106 from the motor driver 102 and determine a ratio of the voltage to the frequency. As illustrated in FIG. 3a, at any particular instant in time the ratio of the voltage and frequency provided by the motor driver 102 may take on any one of an infinite number, where ratios A, B, C, and D are shown for purposes of illustration.

Preferably, when the control unit 100 commands that one or more induction motors 106 enter the regenerative mode, the voltage and frequency provided by the motor driver 102 are reduced while substantially maintaining the ratio of voltage to frequency at which the one or more induction motors 106 were operating. For example, if one or more of the induction motors 106 were operating at a voltage to frequency ratio represented by point A, the control unit 100 preferably commands the regenerative mode by causing the motor driver 102 to provide a reduced voltage and frequency to the induction motors 106 in a way which maintains the ratio of voltage to frequency represented by point A. Graphically, the reduction in voltage and frequency may be represented by linearly traversing voltages and frequencies from point A towards an origin O. Similarly, if the induction motors 106 were operating at a voltage to frequency ratio represented by a point B, C, or D, the control unit 100 preferably commands the regenerative mode by causing the motor driver 102 to reduce the voltage and frequency in a way which maintains the voltage to frequency ratio represented by point B, C, or D, respectively.

Advantageously, substantially maintaining the ratio of voltage to frequency while reducing both the voltage and frequency, substantially maintains amounts of magnetization flux in the respective induction motors 106. Consequently, the induction motors 102 enter the regenerative mode (because the frequency may be reduced by an amount which exceeds the slip frequency) and current drawn by the induction motors 106 does not increase and, in fact, may decrease. Indeed, with reference to FIG. 3b, when the voltage and frequency are reduced in a way which maintains the voltage to frequency ratio, the current, Io, drawn by the induction motors 106 (just prior to entering the regenerative mode) is maintained and might also decrease.

Figure 4:
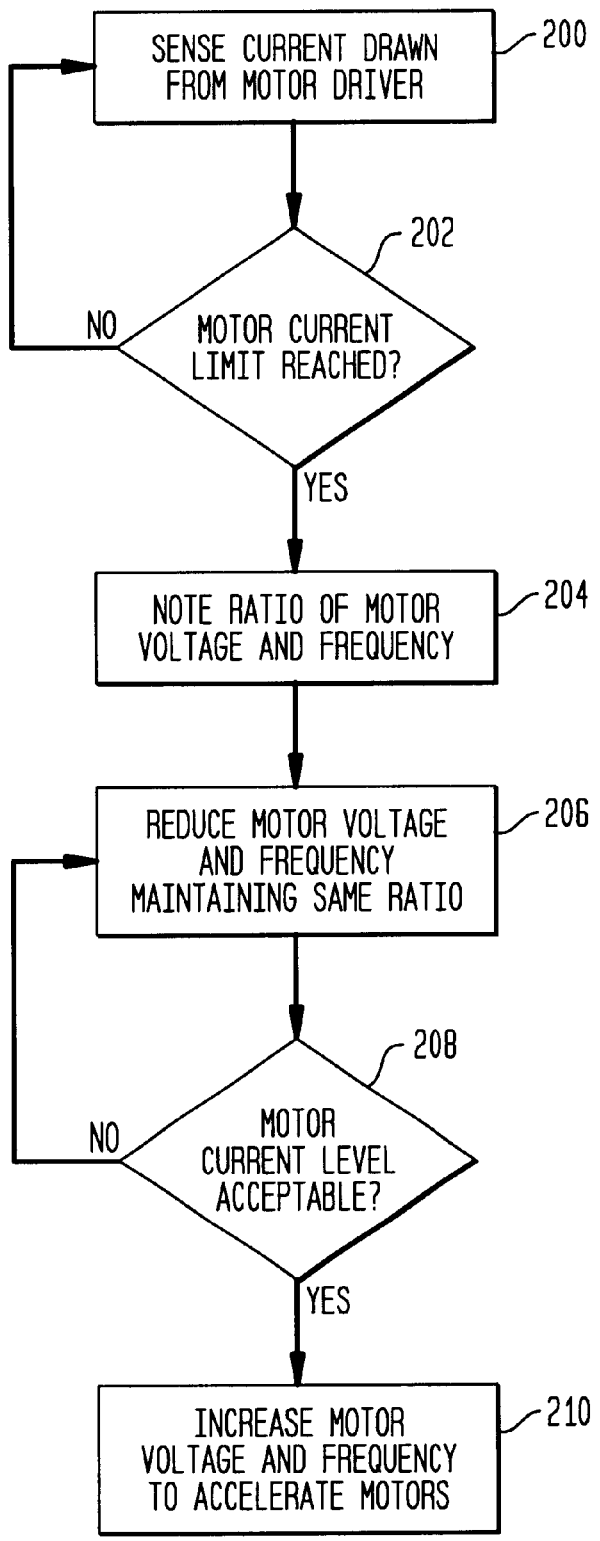
FIG. 4 is a flow diagram illustrating the acts which may be carried out in accordance with the present invention to provide drive power to the plurality of induction motors.

With reference to FIG. 4, voltage and current are provided to the plurality of induction motors 106 by performing certain acts. In particular, at action 200, the control unit 100 preferably senses current drawn from the motor driver 102. At step 202, if a current limit (i.e., a current threshold) is reached, the process flows to action 204, otherwise the process branches back to step 200 where the control unit 100 continues to sense current.

At action 204, current drawn from the motor driver 102 has exceeded the threshold and, in response, the control unit 100 preferably determines the ratio of voltage to frequency at which the induction motors 106 have been operating. It is noted that the ratio of voltage to frequency may be continuously determined as, for example, during the loop from actions 200 to 202, and noting or storing the ratio of voltage to frequency when the threshold is reached or exceeded (action 202).

Next, the process proceeds to action 206 where the control unit 100 commands the motor driver 102 to reduce the voltage and frequency provided to the induction motors 106 while maintaining the ratio of voltage to frequency determined in action 204. This will, for example, cause one or more of the induction motors 106 to enter into the regenerative mode and produce regenerative current which may be utilized by at least one other induction motor 106 requiring start-up current.

At action 208, the control unit 100 determines whether the current drawn from the motor driver 102 by the induction motors 106 has reduced to an acceptable level (which may be substantially below the threshold at which the current limit was reached). It is most preferred that respective magnitudes by which the voltage and frequency to the induction motors 106 are reduced (action 206) are functions of the current drawn by the induction motors 106. In particular, if the current drawn by the induction motors 106 reduces significantly with relatively little reduction in voltage and frequency, then the voltage and frequency are preferably not substantially reduced even further. On the other hand, if the current drawn by the induction motors 106 is not significantly reduced when the voltage and frequency are reduced (action 206), then the control unit 100 preferably commands that the voltage and frequency are further reduced (perhaps substantially reduced).

When the current drawn by the induction motors 106 falls to an acceptable level, then the process branches to action 210 where the motor voltage and frequency are preferably increased such that the induction motors 106 accelerate.

Those skilled in the art will appreciate that the control protocol utilized by the control unit 100 of the invention has particular applicability to systems in which one or more induction motors 106 are rotating while one or more other induction motors 106 are substantially not rotating and are in need of starting up. It is understood, however, that the present invention has much wider applicability and that the above scenario is given by way of example only.

Figure 5:
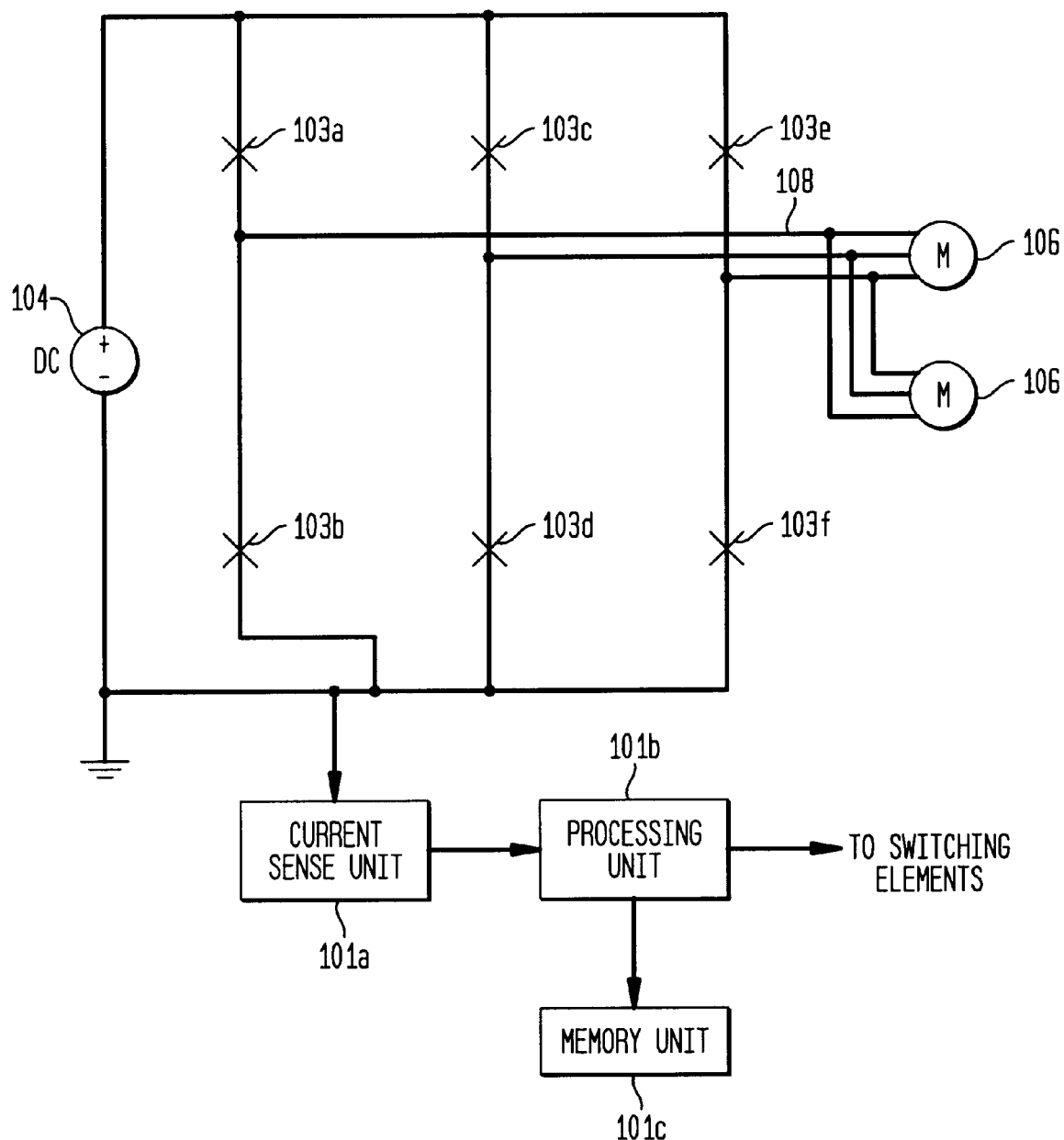
FIG. 5 is a more detailed block diagram illustrating an example of a system for providing three-phase drive power to a plurality of induction motors in accordance with an aspect of the present invention.

Reference is now made to FIG. 5, which is a more detailed block diagram of an apparatus suitable for carrying out one or more aspects of the present invention. As was the case in FIG. 2, the apparatus of FIG. 5 includes a control unit 101, a motor driver 102 (which receives operating power from a DC source 104), and a plurality of induction motors 106 (two motors being shown). The control unit 101 preferably includes a current sense unit 101*a*, a processing unit 101*b*, and a memory unit 101*c*.

The current sense unit 101*a* preferably receives a signal indicative of current drawn by the induction motors 106 from the motor driver 103. Any of the known current sense circuits may be utilized to implement the current sense unit 101*a*, such as analog circuits, magnetic circuits, digital circuits, etc. The current sense unit 101*a* preferably produces a signal indicative of whether the current drawn from the motor driver 102 by the induction motors 106 has reached or exceed the threshold. This signal is preferably input into the processing unit 101*b*.

The processing unit 101*b* may be implemented by using any of the known circuits, such as digital and microprocessor circuits, analog circuits, integrated control circuits, etc. The processor 101*b* is preferably in communication with the memory unit 101*c*, where the memory unit 101*c* is capable of storing data for use by the processing unit 101*b*. In particular, the processing unit 101*b* is preferably capable of receiving an indication of the voltage and frequency provided to the induction motors 106 from the motor driver 102, calculating a ratio of the voltage to frequency, and storing the ratio in the memory unit 101*c* for later use. Those skilled in the art will appreciate that the memory unit may be a digital circuit, an analog circuit (such as a capacitor), or some other class of circuit depending on the exigencies of the application.

The processing unit 101*b* preferably outputs one or more signals indicating the desired magnitudes for the voltage and frequency to be produced by the motor driver 102. As shown in FIG. 5, the motor driver 102 includes six switching elements 103*a* through 103*f* which are arranged in three series coupled pairs. Each pair of switching elements are coupled across a DC bus established by the DC source 104. Common nodes of each pair of switching elements represent respective outputs for each induction motor 106 where each induction motor 106 is a three-phase machine. The motor driver 102 may often contain a plurality of switching power semiconductor devices to implement the switching elements 103*a* through 103*f*, such as MOSFETs, insulated gate bipolar transistors (IGBTs), bipolar transistors, etc. Thus, the signal(s) of the processing unit 101*b* indicative of the voltage and frequency to be produced by the motor driver 102 often contain pulse width modulation (PWM) information.

Although the current sense unit 101*a*, processing unit 101*b*, and memory unit 101*c* are illustrated as separate functional units, it is understood that these elements may be combined into one or more distinct circuit and/or functional blocks depending on the design exigencies of the application.

Advantageously, the apparatus and/or method of the present invention permits operating a plurality of induction motors from a single bus (e.g., from a single motor driver) without requiring that all induction motors be started and/or stopped at the same time. Rather, the plurality of induction motors may be started or stopped at different times or at the same time as is desired by the artisan. This is achieved by utilizing the regenerative capabilities of rotating induction motors to produce regenerative currents which may be used to start other induction motors on the bus. Advantageously, the sizing of electronic components (particularly within the motor driver 102), may be minimized and, therefore, costs reduced without sacrificing system performance.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A motor controller, comprising:
   a driver stage operable to provide voltage and current to a plurality of induction motors over a single power bus; and
   a control unit coupled to the driver stage and operable to monitor the current drawn from the driver stage and cause one or more of the induction motors to operate in a regenerative mode to supply current to at least one other of the induction motors when the current drawn from the driver stage exceeds a threshold.

2. The motor controller of claim 1, wherein the control unit is further operable to monitor a frequency of the voltage from the driver stage and determine a ratio of the voltage to the frequency.

3. The motor controller of claim 2, wherein the control unit is further operable to command the driver stage to reduce the voltage and frequency to the one or more induction motors, while substantially maintaining the determined ratio, when the current drawn from the driver stage exceeds the threshold such that the one or more induction motors operate in the regenerative mode.

4. The motor controller of claim 3, wherein respective magnitudes by which the voltage and frequency to the one or more induction motors are reduced are functions of the current drawn from the driver stage.

5. The motor controller of claim 3, wherein the control unit is further operable to increase at least one of the voltage and frequency to the induction motors such that the regenerative mode is terminated.

6. The motor controller of claim 5, wherein at least one of the voltage and frequency to the induction motors are increased without permitting the current drawn from the driver stage to exceed the threshold.

7. A motor controller for sourcing voltage and current to a plurality of induction motors over a single bus, wherein at least one of the induction motors requires start-up current, the motor controller comprising:
   a driver stage operable to provide the voltage and current to the plurality of induction motors; and
   a control unit coupled to the driver stage and operable to monitor the current drawn from the driver stage and cause one or more of the induction motors to operate in a regenerative mode to supply at least some of the start-up current to the at least one induction motor when the current drawn from the driver stage exceeds a threshold.

8. The motor controller of claim 7, wherein the control unit is further operable to monitor a frequency of the voltage from the driver stage and determine a ratio of the voltage to the frequency.

9. The motor controller of claim 8, wherein the control unit is further operable to command the driver stage to reduce the voltage and frequency to the one or more induction motors, while substantially maintaining the determined ratio, when the current drawn from the driver stage exceeds the threshold such that the one or more induction motors operate in the regenerative mode.

10. The motor controller of claim 9, wherein respective magnitudes by which the voltage and frequency to the one or more induction motors are reduced are functions of the current drawn from the driver stage.

11. The motor controller of claim 9, wherein the control unit is further operable to increase at least one of the voltage and frequency to the induction motors such that the regenerative mode is terminated and the induction motors are accelerated.

12. The motor controller of claim 10, wherein at least one of the voltage and frequency to the induction motors are increased without permitting the current drawn from the driver stage to exceed the threshold.

13. A method of providing voltage and current to a plurality of induction motors over a single bus, comprising:
   sourcing voltage and current to the plurality of induction motors;
   determining whether the current drawn by the induction motors exceeds a threshold; and
   causing one or more of the induction motors to operate in a regenerative mode when the threshold is reached or exceeded such that regenerative current is supplied to at least one of the induction motors.

14. The method of claim 13, further comprising:
   monitoring a frequency of the voltage sourced to the plurality of induction motors; and
   determining a ratio of the voltage to the frequency.

15. The method of claim 14, further comprising sourcing reduced magnitudes of the voltage and frequency to the induction motors while substantially maintaining the determined ratio when the current drawn exceeds the threshold such that the one or more induction motors operate in the regenerative mode.

16. The method of claim 15, wherein the respective magnitudes by which the voltage and frequency to the induction motors are reduced are functions of the current drawn by the induction motors.

17. The method of claim 16, further comprising increasing at least one of the voltage and frequency to the induction motors such that the regenerative mode is terminated and the induction motors are accelerated.

18. The method of claim 17, wherein at least one of the voltage and frequency to the induction motors are increased without permitting the current drawn to exceed the threshold.

19. A method of providing voltage and current to a plurality of induction motors over a single bus, wherein at least one of the induction motors requires start-up current, the method comprising:
   sourcing voltage and current to the plurality of induction motors;
   determining whether the current drawn by the induction motors exceeds a threshold; and
   causing one or more of the induction motors to operate in a regenerative mode when the threshold is reached or exceeded such that regenerative current is supplied to the at least one of the induction motor requiring start-up current.

20. The method of claim 19, further comprising:
   monitoring a frequency of the voltage sourced to the plurality of induction motors; and
   determining a ratio of the voltage to the frequency.

21. The method of claim 20, further comprising sourcing reduced magnitudes of the voltage and frequency to the induction motors while substantially maintaining the determined ratio when the current drawn exceeds the threshold such that the one or more induction motors operate in the regenerative mode.

22. The method of claim 21, wherein the respective magnitudes by which the voltage and frequency to the induction motors are reduced are functions of the current drawn.

23. The method of claim 21, further comprising increasing at least one of the voltage and frequency to the induction motors such that the regenerative mode is terminated and the induction motors are accelerated.

24. The method of claim 23, wherein at least one of the voltage and frequency to the induction motors are increased without permitting the current drawn to exceed the threshold.

* * * * *

UNITED STATES PATENT AND TRADEMARK OFFICE
CERTIFICATE OF CORRECTION

PATENT NO. : 6,373,204 B1
DATED : April 16, 2002
INVENTOR(S) : William Anders Peterson It is certified that error appears in the above-identified patent and that said Letters Patent is hereby corrected as shown below:

Column 1,
Line 47, change "command" to -- control --.

Column 2,
Line 65, change "startup" to -- start-up --.

Column 7,
Lines 12 and 49, change "are" to -- is --.

Column 8,
Lines 10 and 47, change "operate" to -- operates --.
Lines 21 and 58, change "are" to -- is --.
Line 37, change "motor" to -- motors --.

Signed and Sealed this

Fourteenth Day of January, 2003

JAMES E. ROGAN
*Director of the United States Patent and Trademark Office*